United States Patent
Ried et al.

(10) Patent No.: US 11,772,036 B2
(45) Date of Patent: Oct. 3, 2023

(54) METHOD FOR SEPARATING A GAS MIXTURE FLOW USING TEMPERATURE-CHANGE ADSORPTION, AND TEMPERATURE-CHANGE ADSORPTION PLANT

(71) Applicant: Linde GmbH, Pullach (DE)

(72) Inventors: Thomas Ried, Munich (DE); Benedikt Schuerer, Pullach (DE); Gabriel Salazar Duarte, Munich (DE)

(73) Assignee: Linde GmbH, Pullach (DE)

( * ) Notice: Subject to any disclaimer, the term of this patent is extended or adjusted under 35 U.S.C. 154(b) by 355 days.

(21) Appl. No.: 16/962,938

(22) PCT Filed: Jan. 10, 2019

(86) PCT No.: PCT/EP2019/025011
§ 371 (c)(1),
(2) Date: Jul. 17, 2020

(87) PCT Pub. No.: WO2019/149445
PCT Pub. Date: Aug. 8, 2019

(65) Prior Publication Data
US 2021/0053008 A1 Feb. 25, 2021

(30) Foreign Application Priority Data
Jan. 31, 2018 (EP) .................................... 18020044

(51) Int. Cl.
*B01D 53/04* (2006.01)
(52) U.S. Cl.
CPC ..... *B01D 53/0438* (2013.01); *B01D 53/0462* (2013.01); *B01D 2252/103* (2013.01);
(Continued)

(58) Field of Classification Search
CPC ........ Y02C 20/20; Y02C 20/40; B01D 53/02; B01D 53/04; B01D 53/0438;
(Continued)

(56) References Cited

U.S. PATENT DOCUMENTS

| 1,954,056 A | * | 4/1934 | Miller | .................. | B01D 53/04 62/481 |
| 2,157,565 A | * | 5/1939 | Pexton | .................. | B01D 53/04 96/126 |

(Continued)

FOREIGN PATENT DOCUMENTS

| EP | 1 291 067 A2 | 3/2003 |
| WO | 2017/012703 A1 | 1/2017 |

OTHER PUBLICATIONS

Górak, Andrzej Schoenmakers, Hartmut. (2014). Distillation: Operation and Applications—6.2.1 Air Composition, (pp. 257). Elsevier. Retrieved from https://app.knovel.com/hotlink/pdf/id:kt00U70PXD/distillation-operation/air-composition (Year: 2014).*

(Continued)

*Primary Examiner* — Gabriel E Gitman
(74) *Attorney, Agent, or Firm* — Millen White Zelano & Branigan, PC; Brion P. Heaney

(57) ABSTRACT

A method for separating a gas mixture flow, n which uses a temperature-change adsorption plant having a number of adsorption units which are operated in a first and a second operating mode. The first operating mode comprises guiding a gas mixture flow at least in part through an adsorption chamber of an adsorption unit and subjecting this flow to an adsorptive exchange with at least one adsorbent. The second operating mode comprises guiding a first heat transfer fluid flow at a first temperature through a heat-exchange arrangement of an adsorption unit. The first operating mode also comprises guiding a second heat transfer fluid flow at a second temperature through the heat-exchange arrangement (Continued)

of the respective adsorption unit. The adsorption units are operated in a third operating mode which comprises guiding a third heat transfer fluid flow at a third temperature through the heat-exchange arrangement of the respective adsorption unit.

23 Claims, 2 Drawing Sheets

(52) U.S. Cl.
CPC .. *B01D 2257/108* (2013.01); *B01D 2257/502* (2013.01); *B01D 2257/7025* (2013.01)

(58) Field of Classification Search
CPC ............ B01D 53/0454; B01D 53/0462; B01D 53/047; B01D 53/0473; B01D 53/0476; B01D 53/053; B01D 2252/103; B01D 2257/108; B01D 2257/502; B01D 2257/7025; B01D 2257/504; B01D 2257/702; B01D 2257/80; B01D 2256/16; B01D 2256/20; B01D 2256/22; B01D 2256/245; B01D 2259/403
See application file for complete search history.

(56) References Cited

U.S. PATENT DOCUMENTS

| | | | |
|---|---|---|---|
| 4,233,038 A * | 11/1980 | Tao | B01D 53/04 95/139 |
| 6,630,012 B2 | 10/2003 | Wegeng et al. | |
| 6,974,496 B2 | 12/2005 | Wegeng et al. | |
| 7,744,677 B2 | 6/2010 | Barclay et al. | |
| 8,025,720 B2 | 9/2011 | Barclay et al. | |
| 9,272,963 B2 | 3/2016 | Bernhardt et al. | |
| 2003/0015093 A1 | 1/2003 | Wegeng et al. | |
| 2003/0037672 A1* | 2/2003 | Sircar | B01D 53/0462 96/121 |
| 2013/0269523 A1 | 10/2013 | Bernhardt et al. | |
| 2017/0100690 A1* | 4/2017 | Kennedy | C10L 3/104 |
| 2018/0214817 A1 | 8/2018 | Schurer | |

OTHER PUBLICATIONS

International Search Report of the International Searching Authority for PCT/EP2019/025011 dated May 10, 2019.
English translation of International Search Report of the International Searching Authority for PCT/EP2019/025011 dated May 10, 2019.

* cited by examiner

METHOD FOR SEPARATING A GAS MIXTURE FLOW USING TEMPERATURE-CHANGE ADSORPTION, AND TEMPERATURE-CHANGE ADSORPTION PLANT

The invention relates to a method for separating a gas mixture flow using temperature-change adsorption and to a temperature-change adsorption plant according to the respective preambles of the independent claims configured to carry out such a method.

PRIOR ART

Temperature-change adsorption (temperature swing adsorption, TSA) is an adsorptive method for separating gas mixtures in which the adsorbent used is regenerated using thermal energy. Temperature-change adsorption is used, for example, for exhaust gas purification or for the preparation of gas mixtures, such as natural gas or synthesis gas. Other gas mixtures can also be separated in a corresponding manner using temperature-change adsorption, e.g., gas mixtures such as biogas or exhaust gases from chemical or physical gas scrubbing methods, such as rectisol or amine scrubbing, provided that they are suitable in their composition for a corresponding separation. The present invention is not limited to the use of particular adsorbents or gas mixtures.

Temperature-change adsorption makes use of the temperature dependence of adsorption processes. In these processes, an adsorbent which is accommodated in a suitable adsorber container (referred to herein as an "adsorption unit") is flowed through in an operating cycle at a lower temperature level with the gas mixture flow to be separated and is thereby loaded with the respective component or components to be separated from the gas mixture flow. In a subsequent operating cycle, the adsorbent can then be largely freed of this or these components by heating, i.e., introducing thermal energy, and can be "regenerated" in this manner. At least two adsorption units are therefore required for the continuous operation of a temperature-change adsorption plant so that one of the adsorption units can always be flowed through by the gas mixture flow to be separated and can thus be used for separating the gas mixture flow.

The temperature-change adsorption can be used, in particular, in material systems having components which have high adsorption enthalpies. As a rule, the cycle times of the described operating cycles are several hours. Temperature-change adsorption is generally used to remove low-concentration components in gas mixtures and is typically less suitable for removing higher-concentration components.

In traditional plants for temperature-change adsorption, a so-called "regeneration gas" in heated form is conducted directly over the adsorbent. In the process, the regeneration gas takes up the components that were previously adsorbed and are now desorbed due to the temperature increase. The regeneration gas can, for example, be a purified process product, water vapor, or nitrogen. The use of other regeneration gases is also possible.

As an alternative to the use of a regeneration gas which comes into direct contact with the adsorbent, indirect heating of the adsorbent for its regeneration can also be carried out. For this purpose, a heated fluid flow can likewise be used, which is, however, guided through the adsorbent or an adsorber bed—for example, by means of heating lines. A corresponding fluid is also referred to herein as "heat transfer fluid." In the terminology used herein, a heat transfer fluid is thus a liquid or a gas which is guided through a separate flow channel during indirect heating and/or cooling of an adsorber and is thus subjected to indirect heat exchange with the adsorbent. For example, water, thermal oil, water vapor, or hot nitrogen can be used as heat transfer fluid in temperature-change adsorption plants.

Methods for processing gas mixture flows by temperature-change adsorption using an adsorption plant with three adsorption units are known from U.S. Pat. No. 7,744,677 B2 and U.S. Pat. No. 8,025,720 B2. Heat integration takes place between heating and cooling steps. U.S. Pat. No. 9,272,963 B2 proposes a corresponding method in which, however, two adsorption units are used, wherein heat integration is also carried out, and storage tanks and heaters having a large storage volume are used for a heat transfer fluid used in the method.

U.S. Pat. No. 6,630,012 B2 and U.S. Pat. No. 6,974,496 B2 each disclose methods for gas separation by means of indirectly-heated adsorption and thermally-assisted pressure swing adsorption on the basis of a so-called "microchannel heat exchanger." US 2003/0037672 A1 discloses an indirectly-heated temperature-change adsorption method with a tube bundle heat exchanger, wherein an adsorbent is provided in the tubes.

In principle, in the case of temperature-change adsorption methods and corresponding plants, there is the need for measures which reduce energy consumption and, in particular, energy losses.

DISCLOSURE OF THE INVENTION

Against this background, the present invention proposes a method for separating a gas mixture flow using temperature-change adsorption, and a temperature-change adsorption plant with the features of the independent patent claims configured to carry out such a method. Preferred embodiments are the subject matter of the dependent claims and the following description.

Before explaining the features and advantages of the present invention, some of the principles and the terms used are discussed.

Liquid and gaseous mixtures may, in the terminology used herein, be rich or poor in one or more components, wherein "rich" can refer to a content of at least 99%, 99.5%, 99.9%, 99.99%, 99.999%, or 99.9999%, and "poor" can refer to a content of at most 1%, 0.1%, 0.01%, 0.001%, 0.0001%, or 0.00001% on a molar, weight, or volume basis. The term, "predominantly," may correspond to the definition of "rich."

Component mixtures in the terminology used herein may also be enriched with or depleted of one or more components, wherein these terms refer to a corresponding content in another component mixture, using which the component mixture under consideration was formed. According to the terminology used herein, a component mixture is "enriched" if it has at least 10 times, 100 times, or 1,000 times the content of the designated component(s), and is "depleted" if it has at most 0.1 times, 0.01 times, or 0.001 times the content of the designated component(s).

The present application uses the terms, "pressure level" and "temperature level," to characterize pressures and temperatures, which means that corresponding pressures and temperatures in a corresponding plant do not have to be used in the form of exact pressure or temperature values in order to realize the inventive concept. However, such pressures and temperatures are typically in certain ranges whose maximum and minimum values differ by, for example, not more than 1%, 5%, 10%, 20%, or even 50%.

In this case, corresponding pressure levels and temperature levels can lie in disjointed ranges or in ranges which overlap one another. In particular, pressure levels, for example, include unavoidable or expected pressure losses. The same applies to temperature levels.

Advantages of the Invention

The present invention provides a temperature-change adsorption method and a corresponding plant in which several—in particular, three, or at least three—adsorber containers or adsorption units are used, each of which is at least in part filled with adsorbent—for example, in the form of granules or molded bodies. Within the framework of the present invention, such adsorption units can be heated by indirect heat exchange, i.e., they can be flowed through by means of a fluid which does not come into direct contact with the respective adsorbent, but can exchange heat with the adsorbent. As also described below, the adsorption units can be provided in, for example, the form of tube bundle arrangements, wherein the tubes which form a corresponding tube bundle arrangement are filled with adsorbent, and the tubes are flowed around by the respective heat transfer fluid flow or vice versa.

For ease of distinction, a region of an adsorption unit in which an adsorbent is accommodated is hereinafter referred to as an "adsorption chamber." In this case, the adsorption chamber does not have to be continuous, but can also be distributed, for example, over several tubes of a tube bundle arrangement, as described above. Other types of subdivisions of an adsorption chamber are also possible. An adsorption chamber of an adsorption unit is, in other words, the volume provided with an adsorbent. It is understood that, when it is said herein that "an" adsorbent is used or that an adsorption chamber is filled with "an" adsorbent, this does not, within the framework of the present invention, preclude that several different types of the same adsorbent or several different adsorbents can also be used in an adsorption chamber.

Furthermore, it is stated below that the adsorption units used each have a "heat-exchange arrangement." Within the framework of the present invention, such a heat-exchange arrangement is designed for indirect heat transfer between a heat transfer fluid flow and the adsorbent. For example, in the case of a described tube bundle arrangement, indirect heat transfer is carried out across the walls of the tubes forming the tube bundles, and the heat-exchange arrangement is thus formed by the tubes or their walls. This ensures that the adsorbent does not come into direct contact with the respective heat transfer fluid flow.

Within the framework of the present invention, a temperature-change adsorption is carried out to remove one or more components from a gas mixture flow, wherein, as is in principle known in the corresponding methods, one or more adsorption units are typically always flowed through by the gas mixture flow to be treated accordingly. By using several adsorption units, it is possible that one or more other adsorber containers or adsorption units can be regenerated at the same time. However, it is also possible that, in certain time periods, several adsorption units are flowed through in parallel by the gas mixture flow to be treated, and, in the process, no simultaneous regeneration of one or more other adsorption units takes place. It is also understood that—in particular, during short time periods, and, in particular, during switching between different adsorption units—a flow-through can also be completely omitted.

As is known, in addition to heating for desorption of the adsorbed components, corresponding regeneration measures also include, in particular, cooling after desorption, so that a corresponding adsorber container or an adsorption unit—more precisely, the adsorbent present therein—is subsequently available at a temperature level suitable for adsorbing components from the gas mixture flow to be treated. Furthermore, corresponding regeneration measures according to the prior art typically include rinsing the adsorbent to remove desorbed components as much as possible.

Within the framework of the present invention, heating and cooling of the adsorbent takes place during regeneration or after regeneration, but cooling of the adsorbent also takes place during an adsorption process—in particular, in order to remove adsorption heat in this manner. The heating and cooling are always carried out by indirect heat transfer, as described below. In order to minimize the energy demand, the use of several buffer containers—in particular, at least two buffer containers—of which one or at least one is provided in a warm heat transfer circuit, and one or at least one is provided in a cold heat transfer circuit, has proven to be particularly advantageous. It is also possible to provide further buffer containers, which are operated, in particular, at one or more temperature levels between those of the aforementioned buffer containers. The buffer containers used can, in particular, be operated with a variable fluid level.

Advantageously, the present invention comprises, at the beginning of heating for regeneration, supplying a heat transfer fluid or a corresponding heat transfer fluid flow at elevated temperature from the warm buffer container or a medium-temperature buffer container to the respective adsorption unit or units. In doing so, the heat transfer fluid, which is still in the adsorption container(s) or adsorption unit(s) at the beginning of the regeneration, but also heat transfer fluid which has cooled down comparatively strongly at the beginning of the regeneration, leaves the adsorption container(s) or adsorption unit(s) first on the outlet side at an even significantly colder temperature. This heat transfer fluid flow is therefore advantageously first fed into the buffer container(s) or the circuit for cold heat transfer fluid. This is also shown in detail—in particular, with reference to the embodiments according to the invention, which are illustrated in the figures. A corresponding feed advantageously takes place until the temperature of the heat transfer fluid at the outlet of the adsorber container(s) or adsorption unit(s) has risen to a fixed value. If this is the case, the exiting heat transfer fluid is instead fed into the warm circuit or a corresponding buffer container.

Within the framework of the present invention, an at least partial—in particular, a complete—mixture of heat transfer fluid flows, which exit from different adsorber containers or adsorption units at different temperatures, can also take place as an alternative to the previously described measures. A mixed heat transfer fluid formed in this manner can be obtained at an intermediate temperature level. In particular, it can subsequently be divided, wherein one portion can be heated and used for heating one or more containers or adsorption units, and another portion can be cooled and used for cooling one or more adsorber containers or adsorption units. A corresponding mixing can take place by simple combining in a collecting line, or a buffer container can be provided into which different heat transfer fluid flows are fed and there mixed.

As a whole, the present invention proposes a method for separating a gas mixture flow using temperature-change adsorption, in which a temperature-change adsorption plant with several adsorption units is used, each of which is operated in a first and a second operating mode.

The first operating mode comprises guiding the gas mixture flow at least in part through an adsorption chamber of the respective adsorption unit and subjecting this flow to adsorptive exchange of material with at least one adsorbent in the adsorption chamber of the respective adsorption unit. This operating mode thus corresponds to a regular adsorption operation, in which one or more adsorption units can also be used in parallel.

Furthermore, in the method in the second mode, a first heat transfer fluid flow is guided at a first temperature level through a heat-exchange arrangement in the respective adsorption unit, and heat from the first heat transfer fluid flow is indirectly transferred to the at least one adsorbent in the adsorption chamber of the respective adsorption unit. The first temperature level is at least temporarily above a temperature level at which the at least one adsorbent is present in the second operating mode. The second operating mode thus corresponds to a heating of the corresponding adsorption unit, and thus to a regeneration operation or a first phase thereof. In the second operating mode, in contrast to the first operating mode, the gas mixture flow or a portion thereof is not guided through the adsorption chamber of the respective adsorption unit. In other words, in the second operating mode, no adsorptive exchange of material takes place; rather, desorption of adsorbed components for regeneration of the at least one adsorbent is carried out.

In other words, the first operating mode is used for the adsorptive separation of the gas mixture flow or a portion thereof, wherein adsorbable components adsorb to the respective adsorbent. In contrast, the operating mode referred to here as the second operating mode is used for regeneration. It is understood that the operating modes of the different adsorption units are coordinated with one another in a suitable manner in the method according to the invention. In particular, at least one adsorption unit is, advantageously, always operated in the first operating mode, such that an adsorptive separation can always be carried out. In parallel, one or more other adsorption units can in each case be operated in the second operating mode. This corresponds to an alternating operation of different adsorption units, as has been described above and is known in principle from the field of adsorption technology. The number of adsorption units respectively operated in the different operating modes depends upon the total number of adsorption units present and is, in principle, not limited.

According to the invention, the first operating mode further comprises guiding a second heat transfer fluid flow at a second temperature level through a heat-exchange arrangement in the respective adsorption unit and transferring heat from the at least one adsorbent in the adsorption chamber of the respective adsorption unit indirectly to the second heat transfer fluid flow. The second temperature level is at least temporarily below a temperature level at which the at least one adsorbent is present in the first operating mode. In this manner, as already mentioned, adsorption heat can be dissipated, which is released in the respective adsorption unit during the adsorption cycle, i.e., in the first operating mode.

Furthermore, it is provided within the framework of the present invention that the adsorption units each be operated in a third operating mode, which comprises guiding a third heat transfer fluid flow at a third temperature level, which, in particular, can also correspond to the second temperature level, through the heat-exchange arrangement of the respective adsorption unit, and heat from the at least one adsorbent in the adsorption chamber of the respective adsorption unit being indirectly transferred to the third heat transfer fluid flow. The third temperature level is at least temporarily below a temperature level at which the at least one adsorbent is present in the third operating mode. The respective adsorption unit or the at least one adsorbent therein is thus cooled by means of the third heat transfer fluid flow, such that the adsorption unit or the at least one adsorbent is available for subsequent adsorption processes at a suitable temperature. In the third operating mode, in contrast to the first operating mode and as in the second operating mode, the gas mixture flow or a portion thereof is not guided through the adsorption chamber of the respective adsorption unit. In other words, in the third operating mode as well, no adsorptive exchange of material takes place; rather, cooling of the at least one adsorbent is carried out after the regeneration of the at least one adsorbent in the second operating mode.

According to the invention, it is therefore provided that the at least one adsorbent of the respective heat-exchange unit be cooled in the first operating mode, that the at least one adsorbent of the respective heat-exchange unit be heated in the second operating mode, and that the at least one adsorbent of the respective heat-exchange unit be cooled again in the third operating mode. Within the framework of the present invention, the first, second, and third operating modes are each carried out in the order indicated. The first, second, and third operating modes thereby take place, with respect to the respective adsorption unit, in non-overlapping time periods.

Advantageously, the adsorption units comprise at least three adsorption units, wherein, at least during one operating period, one of the three adsorption units can be operated in the first operating mode, another of the three adsorption units can simultaneously be operated in the second operating mode, and another of the three adsorption units can simultaneously be operated in the third operating mode.

It is emphasized that the present invention is not limited to the use of a temperature-change adsorption plant having a certain number of adsorption units. In particular, parallel adsorption by means of several adsorption units or a corresponding parallel gas separation can also be provided. Several adsorption units can also respectively be regenerated in parallel. In principle, however, the operating modes used in parallel here are the same.

The use of the present invention results, in particular, in energy savings by heat integration in comparison with indirectly-heated temperature-change adsorption plants, in which the heat transfer fluid is always completely heated or cooled.

The energy released during adsorption of gases leads to heating of the adsorbent, and thus to a decrease in the achievable loading. By cooling during adsorption, as is provided according to the invention in the first operating mode by the use of the second heat transfer fluid, the achievable loading can be increased, and thus the working capacity of the adsorbent can be significantly increased. By the working capacity of an adsorbent, the person skilled in the art understands the difference in the loading of the adsorbent after the adsorption and after the regeneration.

Another advantage that can be achieved by the use of the present invention is the minimization of product losses. This advantage results from the indirect heating and cooling, wherein only small quantities of product gas or feed gas, or even no product gas or feed gas, are used for rinsing during the regeneration phase. In contrast, in conventional temperature-change adsorption plants or in the corresponding methods, larger quantities of regeneration gas are required for heating and cooling. When feed or product gas is used as the regeneration gas, higher product losses clearly occur.

The advantages according to the invention can be achieved, in particular, in a preferred embodiment of the present invention, which comprises the first heat transfer fluid flow used in the second operating mode being at least in part taken from a first buffer container at the first temperature level and then being guided through the heat-exchange arrangement of the respective adsorption unit, the second heat transfer fluid flow used in the first operating mode being at least in part taken from a second buffer container at the second temperature level, which in this case is below the first temperature level, and then being guided through the heat-exchange arrangement of the respective adsorption unit, and the third heat transfer fluid flow used in the third operating mode being at least in part taken from the second buffer container at the third temperature level, which in this case corresponds to the second temperature level, and then being guided through the heat-exchange arrangement of the respective adsorption unit. In other words, in this embodiment, the present invention proposes the use of a warm and a cold buffer container, wherein the "first" buffer container represents the warm buffer container, and the "second" buffer container represents the cold buffer container.

In this embodiment of the present invention, the first temperature level at which the first (warm) buffer container is operated and at which the first heat transfer fluid flow is present is, in particular, 50 to 250° C., and, preferably, 90 to 220° C. In contrast, in this embodiment, the second temperature level of the second (cold) buffer container, and thus of the second heat transfer fluid flow, is, in particular, 0 to 120° C., and, preferably, 0 to 90° C. As mentioned, the third temperature level matches the second in this embodiment.

As already described, energy savings can be achieved by the use of the two buffer containers for warm and cold heat transfer fluid or by the creation of corresponding fluid circuits, wherein, in particular, heating the entire heat transfer fluid continuously can be dispensed with.

Advantageously, the first and/or third operating modes comprise, at least in part, a first time period and a second time period after the first time period, which differ in terms of the treatment of the respective heat transfer fluid flow after it has been guided through the corresponding heat-exchange unit.

In a first embodiment, after being guided, in the second operating mode, through the heat-exchange arrangement of the respective adsorption unit, the first heat transfer fluid flow is at least in part supplied to the second buffer container in the first time period and is at least in part supplied to the first buffer container in the second time period.

The first heat transfer fluid flow, as long as it is still comparatively cold because colder heat transfer fluid is still present in the corresponding adsorption unit or the adsorption unit is still comparatively cold overall, is thus, advantageously, supplied to the second, "cold" buffer container. In this manner, excessive cooling of the heat transfer fluid in the first buffer container is avoided. When the heat transfer fluid flow has reached a sufficient temperature, it can be supplied to the first buffer container. In this manner, in the proposed embodiment of the present invention, the energy requirement is reduced because the heating of heat transfer fluid can be reduced.

Typically, after being guided, in the first operating mode, through the heat-exchange arrangement of the respective adsorption unit, the second heat transfer fluid flow is always at least in part supplied to the second buffer container. Thus, a different feed is not carried out in a first and a second time period, since the adsorption heat released in the first operating mode is significantly less in comparison with the energy required for tempering the entire adsorber (steel mass and adsorbent). This results in only slight heating of the heat transfer fluid.

In contrast, it can be provided within the framework of the present invention that, as an alternative or in addition to the corresponding treatment of the first heat transfer fluid flow in the first and second time periods, the third heat transfer fluid flow, after being guided, in the third operating mode, through the heat-exchange arrangement of the respective adsorption unit, be at least in part supplied to the first buffer container in a first time period and be at least in part supplied to the second buffer container in a second time period. The respective first and second time periods used in the second and third operating modes may be selected independently of each other, as needed.

As mentioned, the third operating mode is carried out for cooling the adsorbent after a previous regeneration. Naturally, the heat transfer fluid, which is taken from the corresponding adsorption unit immediately after the end of the heating phase, is still at a high temperature. This would therefore, on the one hand, excessively increase the temperature in the second buffer container. On the other hand, the energy contained in the third heat transfer fluid flow in the first time period represents usable energy that would otherwise be lost.

In contrast, according to a particularly preferred embodiment of the present invention, which may be provided as an alternative to the previously described embodiments, the first heat transfer fluid flow, after being guided, in the second operating mode, through the heat-exchange arrangement of the respective adsorption unit, and/or the second heat transfer fluid flow, after being guided, in the first operating mode, through the heat-exchange arrangement of the respective adsorption unit, and/or the third heat transfer fluid flow, after being guided, in the third operating mode, through the heat-exchange arrangement of the respective adsorption unit, are at least in part supplied to mixing.

In this manner, it is possible within the framework of the present invention to set mixing temperatures which are particularly suitable for certain applications. Furthermore, in this manner, heat transfer fluid flows, which can subsequently be heated or cooled, and thus used for regeneration or cooling, can also be formed. In particular, in a corresponding mixing, the heat transfer fluid can be divided at an average temperature level, and one portion can be heated and used to heat one or more adsorption units, and another portion can be cooled and used to cool one or more adsorption units.

Within the framework of the present invention, the mixing can in this case be carried out by combining the fluid flows into a collecting line and/or by feeding them into a mixing container. Feeding into a mixing container has the particular advantage that, at fluctuating temperatures, a buffering effect can be achieved by fluid already present in the mixing container, and large temperature fluctuations thereby be avoided.

As already mentioned, within the framework of the present invention, corresponding mixed fluids can also be used as heat transfer fluids, such that a particularly preferred embodiment of the present invention comprises using one or more mixed fluids, formed in the mixing, at least in part in the formation of the first and/or the second and/or the third heat transfer fluid flow. In particular, as mentioned, heating and/or cooling of portions of a corresponding mixed fluid can take place in the process.

According to a particularly preferred embodiment of the method according to the invention, the adsorption chamber of the respective adsorption units in the second operating mode and/or in the third operating mode is at least temporarily flowed through by a circulating gas flow, which can be conveyed, in particular, by means of a blower. In this manner, the heat transfer can be improved, and the heating and cooling times thus reduced, because local temperature maxima and temperature minima can be avoided.

According to a further preferred embodiment of the method according to the invention, gas is withdrawn from the adsorption chamber of the respective adsorption units at the beginning of the second operating mode and is recycled into the method. The recirculation can be effected, in particular, to an adsorption unit which at that time is in the adsorption mode, i.e., the first operating mode.

In particular, it can also be provided within the framework of the present invention that gas be conducted from the adsorption chamber of the respective adsorption units during at least part of the second operating mode, and be transferred into a buffer container. The gas exiting from a corresponding adsorption unit during the regeneration typically exhibits strong fluctuations in volume flow and composition. A sufficiently large buffer container can be used to compensate for these fluctuations. In doing so, at the outlet of a corresponding buffer container, a flap is optionally installed, by means of which a volume flow exiting the buffer container can be kept constant at a certain pressure. This pressure is lower than the minimum pressure of the gas that flows from the adsorption unit during the regeneration. Accordingly, with fluctuating inlet flow, a varying pressure in the buffer container results.

According to a particularly preferred embodiment of the present invention, the gas mixture flow has a content of 0.01 to 20 mol %—in particular, 0.1 to 10 mol %—of one or more components preferentially adsorbing to the at least one adsorbent and, in the remainder, has one or more components which are less strongly adsorbable to the first, second, and third adsorbents. The question of which components are "preferentially adsorbing components" and which components are "less strongly-adsorbing components" depends upon the choice of adsorbent used in each case. In principle, adsorption of the preferentially adsorbing components also does not take place completely in this case. A small proportion of the less strongly-adsorbing components also adsorbs to the corresponding adsorbent.

Examples of correspondingly treatable gas mixtures have already been described above. In particular, the one or more preferentially adsorbing components may comprise carbon dioxide and/or water and/or hydrocarbons having more than two or more than three carbon atoms, and the one or more less strongly-adsorbing components may comprise hydrogen and/or methane and/or carbon monoxide. In such an embodiment, the method according to the invention is particularly suitable for processing methane-rich gases, e.g., natural gas, biogas, or mine gas, or for processing hydrogen-rich gases, such as synthesis gas.

In contrast, according to an additional preferred embodiment of the present invention, the one or more preferentially adsorbing components comprise water and/or hydrocarbons, and the one or more less strongly-adsorbing components comprise carbon dioxide. In such an embodiment, the method according to the invention is particularly suitable for separating water and/or hydrocarbons from gas mixtures, such as biogas, exhaust gas from gas scrubbing or amine scrubbing, or gas mixtures from natural sources, such as mines or tunnels and gas fields.

As already mentioned, in particular, tube bundle arrangements can be used in the absorption units within the framework of the present invention. A particularly preferred embodiment of the present invention therefore comprises the first and/or the second and/or the second and/or the third adsorption units each being embodied as containers with tube bundles, wherein the respective adsorbent is filled in an inner chamber of the tubes forming the tube bundles, and the respective heat transfer fluid flow flows around the tubes or vice versa.

In other words, a tube bundle heat exchanger, in particular, can be used, in which an adsorbent is provided in the tubes, and the heat transfer fluid flows on the sheathed side of the tubes. In particular, in such an arrangement, but also in the arrangements with tube bundles described below, inner tube diameters of between 2.6 and 4.9 cm or 10 cm can be used. In the embodiment described, it is, in particular, also possible to use fins on the inner side of the tube for the purpose of enlarging the heat transfer surface towards the adsorbent, and thus for more rapid heating or cooling of the adsorbent. In principle, however, it is also possible to design a corresponding tube bundle arrangement in such a manner that the heat transfer fluid or a corresponding heat transfer fluid flow flows in the tubes, and the adsorbent is provided on the shell side. In this case as well, additional fins can be provided, which in this case, however, are arranged, in particular, on the outer side of the tube, in order to enlarge the heat transfer surface towards the adsorbent.

In principle, the temperature-change adsorption plant according to the invention or a corresponding method can also be assigned at least one additional separation step. In particular, a residual gas formed by the temperature-change adsorption according to the present invention can thus be processed by means of a membrane system in order, for example, to discharge residues of carbon dioxide as permeate. A methane-containing retentate formed in the process can be guided at high pressure to the feed gas or to the product gas.

In principle, the heat transfer fluid, which is used within the framework of the present invention in the form of heat transfer fluid flows, can be formed from water or water vapor. Alternatively, the use of, in particular, synthetic, thermal oils is also possible. Thereby, the respective use depends, in particular, upon the temperatures to be achieved in corresponding plants.

In principle, the adsorbent(s) within the framework of the present invention can be provided in, for example, the form of granules or packets. Zeolites, activated carbons, silica gels, aluminum gels, or organometallic scaffolds are particularly suitable.

According to a particularly preferred embodiment of the present invention, it can be provided that pressure changes caused by the first and/or the second and/or the third heat exchange can be compensated for. In particular, heating can thus be carried out with the simultaneous discharge of gas from the respective adsorption unit(s), such that the pressure in the adsorption unit(s) can be kept constant or be reduced, despite desorption and thermal expansion. Accordingly, cooling with the simultaneous supply of gas into the respective adsorption unit(s) is also possible, such that the pressure in the adsorption unit(s) can be kept constant or rises despite the adsorption of gas to the adsorbent and contraction of the gas due to the falling temperature. This applies above all when the adsorption chamber is heated or cooled as a closed system. (Cooling and adsorption in this case lead, in the adsorption chamber, to a decrease in pressure, and heating to an increase in pressure.)

The present invention may also include, during or after heating the adsorbent, rinsing it with purified product, in order to promote desorption. An additional aspect which can be realized within the framework of the present invention is the increase in the feed gas flow, i.e., the gas mixture flow, which is processed in the plant, during the phases of rinsing and/or pressure buildup, in order to, in this manner, prevent the product flow from decreasing during these steps and ensure a constant product flow at the outlet of the plant.

As also mentioned, in particular, within the framework of the present invention, an operation of at least two adsorption units can take place, simultaneously, at least temporarily in the adsorption mode, i.e., the first operating mode, in order to, in this manner, minimize, in particular, concentration and/or volume flow changes and/or temperature fluctuations in the product flow.

According to another embodiment of the present invention, at least a portion of the residual gas can be burned off in a heater, and a portion of the heat transfer fluid or a corresponding heat transfer fluid flow thereby heated with at least a portion of the released heat. This heat transfer fluid can then be used for indirectly heating the adsorber.

The total volume of all buffer containers for the heat transfer fluid used within the framework of the present invention corresponds at least to the total volume of heat transfer fluid in the adsorbers (relative to all adsorbers together).

Within the framework of the present invention, it is particularly advantageous to use vapor or cooling towers with an open (water) circuit for cooling the heat transfer fluid. In this case, the cooling of the heat transfer fluid takes place indirectly via a heat exchanger. Alternatively, the use of air coolers for cooling the heat transfer fluid can also be provided.

As mentioned, the present invention also proposes a pressure swing adsorption plant, wherein, for the features thereof, reference is made to the corresponding independent patent claim.

In particular, such a temperature-change adsorption plant is characterized by means which enable it to operate according to one of the previously described methods or corresponding embodiments. For further features and advantages of a corresponding temperature-change adsorption plant, reference is therefore explicitly made to the descriptions above.

The invention is described in more detail below with reference to the accompanying drawings, which illustrate an embodiment of the present invention.

DETAILED DESCRIPTION OF THE DRAWINGS

Figure 1A:
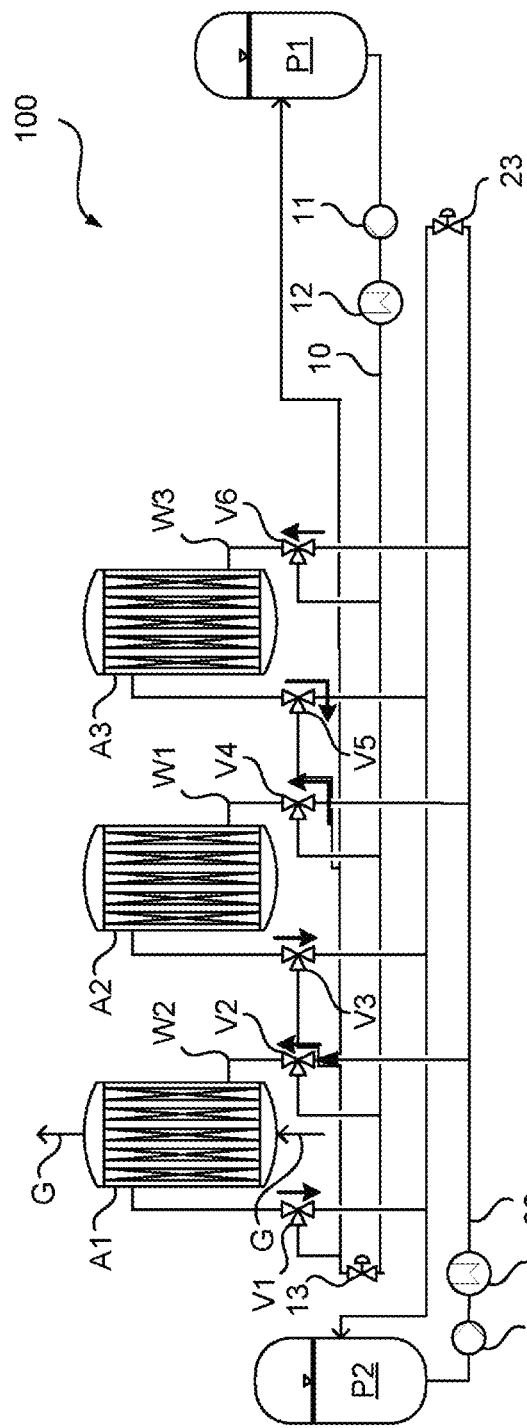
FIG. 1A shows a temperature-change adsorption plant according to an embodiment of the invention in a first time period of an operating cycle.

FIG. 1A illustrates a temperature-change adsorption plant 100 according to an embodiment of the present invention in a first time period of an operating cycle.

Essential components of the temperature-change adsorption plant 100 are a first adsorption unit A1, a second adsorption unit A2, and a third adsorption unit A3. However, as explained, the present invention is not limited to the use of only or exactly three adsorption units.

In the snapshot shown in FIG. 1A, the first adsorption unit A1 is operated in the first operating mode described in detail above, i.e., a separation of a gas mixture flow takes place, which is denoted here by G and which is subjected to an adsorptive exchange of material for this purpose. Furthermore, in the snapshot shown in FIG. 1A, the second adsorption unit A2 is heated in order to desorb adsorbed components, i.e., it is operated in the second operating mode described in detail above. By contrast, the third adsorption unit A3 is cooled at the time shown in order to prepare it for use for separating a gas mixture flow (the gas mixture flow G which flows through the third adsorption unit A1 in the operating cycle shown). Thus, it is operated in the operating mode. The snapshot corresponds, for example, to an operating cycle of a corresponding method.

In a next operating cycle, the adsorption unit A3 cooled in the illustrated operating cycle can be used for the adsorption, i.e., it can then be operated in the first operating mode, the correspondingly previously regenerated adsorption unit A2 can, on the other hand, be cooled, i.e., it can then be operated in the third operating mode, and the adsorption unit A1 previously used for adsorption can be heated, i.e., it can be operated in the second operating mode.

In other words, as illustrated in FIG. 1A, the first adsorption unit A1 is operated in such a manner that a gas mixture flow G is guided through an adsorption chamber of this first adsorption unit and is subjected to an adsorptive exchange of material with at least one adsorbent in the adsorption chamber of the first adsorption unit. In the process, at least partial separation of the more strongly or preferentially adsorbable components takes place.

Furthermore, a first heat transfer fluid flow, here denoted by W1, is guided at a first temperature level through a heat-exchange arrangement of the second adsorption unit A2 and is in the process subjected to indirect heat exchange with at least one adsorbent in an adsorption chamber of the second adsorption unit A2. In the process, heat from the first heat transfer fluid flow W1 is transferred indirectly to the at least one adsorbent. The at least one adsorbent is thereby heated.

Furthermore, in the example shown, a second heat transfer fluid flow, here denoted by W2, is guided at a second temperature level through a heat-exchange arrangement in the first adsorption unit A1 and is in the process subjected to indirect heat exchange with the at least one adsorbent present there, in order to remove adsorption heat. Thus, heat from the at least one adsorbent is indirectly transferred to the second heat transfer fluid flow W2.

A third heat transfer fluid flow, here denoted by W3, is guided at a third temperature level, which may correspond to the second temperature level, through a heat-exchange arrangement in the third adsorption unit A3 and is in the process subjected to indirect heat exchange with at least one adsorbent in an adsorption chamber of the third adsorption unit. Thus, heat from the at least one adsorbent is indirectly transferred to the third heat transfer fluid flow W3.

As illustrated in FIG. 1A, a first ("warm") heat transfer fluid circuit 10 and a second ("cold") heat transfer fluid circuit 20 are provided in the temperature-change adsorption plant 100. These heat transfer fluid circuits 10, 20 are coupled to a first ("warm") buffer container P1 and a second ("cold") buffer container P2, respectively.

Figure 1B:
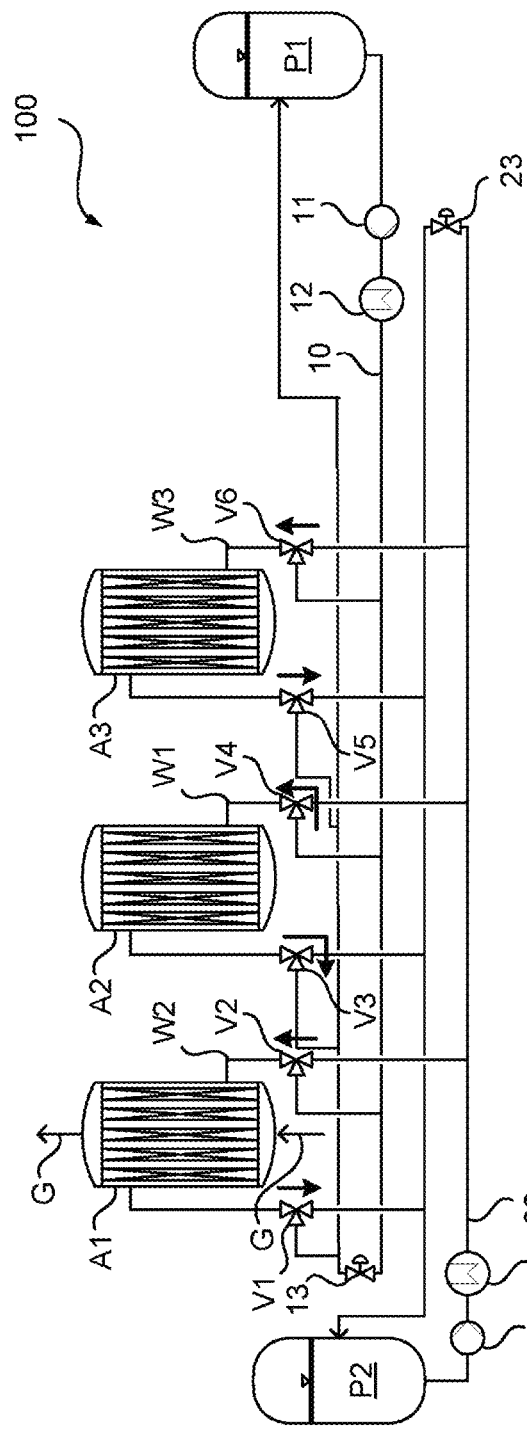
FIG. 1B illustrates the plant according to FIG. 1A in a second time period of the operating cycle shown in FIG. 1A.

As illustrated by arrows in bold type in each case, in a first time period shown in FIG. 1A, but also in a second time period shown in FIG. 1B, the first heat transfer fluid flow W1 at the first temperature level is at least in part taken from the first buffer container P1 and then, as described, used in the second adsorption unit A2.

Furthermore, the second heat transfer fluid flow W2 at the second temperature level, which is below the first temperature level, is at least in part taken from the second buffer container P2 and then, as described, used in the first adsorption unit A1.

The third heat transfer fluid flow W3 is, at the third temperature level, which may correspond to the second temperature level, as mentioned several times, at least in part taken from the second buffer container and then, as described, used in the third adsorption unit A3.

The fluid paths illustrated in FIGS. 1A and 1B in each case with arrows in bold type can be adjusted by, in particular, three-way valves V1 through V6 symbolically illustrated here. The flow direction within the adsorption units A1 through A3 can, as indicated, be from top to bottom, but also from bottom to top. Furthermore, in each case, one pump 11 or 21 and one heat exchanger 12 and 22 are integrated into the corresponding heat transfer fluid circuits 10 and 20. A flowing fluid quantity can be adjusted, in particular, via a valve 13 or 23.

As can be seen from the combination of FIGS. 1A and 1B, as illustrated with the arrows in bold type, the first heat transfer fluid flow W1 is at least in part supplied to the second buffer container P2 downstream of the second adsorption unit A2, but is at least in part supplied to the first buffer container P1 in the second time period illustrated in FIG. 1B.

The second heat transfer fluid flow W2, on the other hand, downstream of the first adsorption unit A1, is preferably supplied at least in part to the second buffer container P2, both in the first and in the second time periods, according to FIGS. 1A and 1B.

Lastly, the third heat transfer fluid flow W3, downstream of the third adsorption unit A3, is at least in part supplied to the first buffer container P1 in the first time period shown in FIG. 1A, but is at least in part supplied to the second buffer container P2 in the second time period.

The corresponding fluids are fed in or discharged via the respective fluid circuits 10 and 20 with the further technical devices illustrated. The respective advantages of the explained measures have already been discussed in detail above.

The invention claimed is:

1. A method for separating a gas mixture flow, in which a temperature-change adsorption plant (100) is used, which has a plurality of adsorption units (A1, A2, A3) which are respectively operated in a first operating mode and a second operating mode, wherein
the first operating mode comprises:
guiding the gas mixture flow (G) at least in part through an adsorption chamber of a respective adsorption unit (A1, A2, A3); and
subjecting the gas mixture flow to an adsorptive exchange of material with at least one adsorbent in the adsorption chamber of the respective adsorption unit; and
the second operating mode comprises:
guiding a first heat transfer fluid flow (W1) at a first temperature level through a heat-exchange arrangement of the respective adsorption unit (A1, A2, A3) and transferring heat from the first heat transfer fluid flow (W1) indirectly to the at least one adsorbent in the adsorption chamber of the respective adsorption unit,
wherein
the first operating mode further comprises guiding a second heat transfer fluid flow (W2) at a second temperature through the heat-exchange arrangement of the respective adsorption unit (A1, A2, A3) and transferring heat from the at least one adsorbent in the adsorption chamber indirectly to the second heat transfer fluid flow (W2), and
the adsorption units (A1, A2, A3) are respectively operated in a third operating mode which comprises guiding a third heat transfer fluid flow (W3) at a third temperature level through the heat-exchange arrangement of the respective adsorption unit (A1, A2, A3) and transferring heat from the at least one adsorbent in the adsorption chamber indirectly to the third heat transfer fluid flow (W3), and
(a) after being guided, in the second operating mode, through the heat-exchange arrangement of the respective adsorption unit (A1, A2, A3), the first heat transfer fluid flow (W1) is at least in part supplied to a second buffer container (P2) in a first time period and is at least in part supplied to a first buffer container (P1) in a second time period after the first time period, and/or
(b) after being guided, in the third operating mode, through the heat-exchange arrangement of the respective adsorption unit (A1, A2, A3), the third heat transfer fluid flow (W3) is at least in part supplied to the first buffer container (P1) in said first time period and is at least in part supplied to the second buffer container (P2) in said second time period after the first time period.

2. The method according to claim 1, in which the second temperature is below the first temperature and the third temperature is the same as the second temperature, wherein
in the second operating mode, the first heat transfer fluid flow (W1) at the first temperature is at least in part taken from the first buffer container (P1) and is then guided through the heat-exchange arrangement of the respective adsorption unit (A1, A2, A3),
in the first operating mode, the second heat transfer fluid flow (W2) at the second temperature is at least in part taken from the second buffer container (P2) and is then guided through the heat-exchange arrangement of the respective adsorption unit (A1, A2, A3), and
in the third operating mode, the third heat transfer fluid flow (W3) at the third temperature is at least in part taken from the second buffer container (P2) and is then guided through the heat-exchange arrangement of the respective adsorption unit (A1, A2, A3).

3. The method according to claim 1, in which
after being guided, in the second operating mode, through the heat-exchange arrangement of the respective adsorption unit (A1, A2, A3), the first heat transfer fluid flow (W1) is at least in part supplied to the second buffer container (P2) in the first time period and is at least in part supplied to the first buffer container (P1) in the second time period after the first time period.

4. The method according to claim 1, in which the first heat transfer fluid flow (W1), after being guided, in the second operating mode, through the heat-exchange arrangement of the respective adsorption unit (A1, A2, A3), and/or the second heat transfer fluid flow (W2), after being guided, in the first operating mode, through the heat-exchange arrangement of the respective adsorption unit (A1, A2, A3), and/or the third heat transfer fluid flow (W3), after being guided, in the third operating mode, through the heat-exchange arrangement of the respective adsorption unit (A1, A2, A3), is/are at least in part supplied to a mixing unit.

5. The method according to claim 1, in which the adsorption chamber of the respective adsorption units (A1, A2, A3) in the second operating mode and/or in the third operating mode is/are at least temporarily flowed through by a circulating gas flow which is conveyed by means of a blower.

6. The method according to claim 1, in which a gas is conducted from the adsorption chamber of the respective adsorption units (A1, A2, A3) at the beginning of the second operating mode and is recycled into the plant.

7. The method according to claim 1, in which a gas is conducted from the adsorption chamber of the respective adsorption units (A1, A2, A3) during at least part of the second operating mode and is transferred into a buffer container.

8. The method according to claim 1, in which the gas mixture flow contains 0.01 to 20 mol % of one or more components which preferentially adsorb to the at least one adsorbent and, in the remainder, contains one or more components which adsorb less strongly to the at least one adsorbent.

9. The method according to claim 8, in which the one or more preferentially adsorbing components comprise carbon dioxide and/or water and/or hydrocarbons having more than two or more than three carbon atoms, and in which the one or more less strongly adsorbable components comprise hydrogen and/or methane and/or carbon monoxide.

10. The method according to claim 8, in which the one or more preferentially adsorbing components comprise water and/or hydrocarbons, and in which the one or more less strongly-adsorbing components comprise carbon dioxide.

11. The method according to claim 1, in which the adsorption units (A1, A2, A3) are designed as containers with tube bundles, wherein the at least one adsorbent is filled in an inner chamber of the tubes forming the tube bundles, and the respective heat transfer fluid flow (W1, W2, W3) flows around the tubes or vice versa.

12. The method according to claim 1, in which the first, second, and third heat transfer fluid flows (W1, W2, W3) comprise water, water vapor, or thermal oil.

13. The method according to claim 1, in which the plurality of adsorption units of the plant comprises at least first, second, and third adsorption units which are of identical design.

14. The method according to claim 1, in which pressure changes in the respective adsorption chamber, caused by heat exchanges in the first, second and third operating modes, are compensated for.

15. The method according to claim 1, wherein after being guided, in the third operating mode, through the heat-exchange arrangement of the respective adsorption unit (A1, A2, A3), the third heat transfer fluid flow (W3) is at least in part supplied to the first buffer container (P1) in the first time period and is at least in part supplied to the second buffer container (P2) in the second time period after the first time period.

16. The method according to claim 1, in which
after being guided, in the second operating mode, through the heat-exchange arrangement of the respective adsorption unit (A1, A2, A3), the first heat transfer fluid flow (W1) is at least in part supplied to the second buffer container (P2) in the first time period and is at least in part supplied to the first buffer container (P1) in the second time period after the first time period, and after being guided, in the third operating mode, through the heat-exchange arrangement of the respective adsorption unit (A1, A2, A3), the third heat transfer fluid flow (W3) is at least in part supplied to the first buffer container (P1) in said first time period and is at least in part supplied to the second buffer container (P2) in said second time period after the first time period.

17. The method according to claim 1, wherein
the first heat transfer fluid flow (W1), after being guided, in the second operating mode, through the heat-exchange arrangement of the respective adsorption unit (A1, A2, A3), the second heat transfer fluid flow (W2), after being guided, in the first operating mode, through the heat-exchange arrangement of the respective adsorption unit (A1, A2, A3), and the third heat transfer fluid flow (W3), after being guided, in the third operating mode, through the heat-exchange arrangement of the respective adsorption unit (A1, A2, A3), are each at least in part supplied to a mixing unit.

18. The method according to claim 1, wherein the first temperature is 50 to 250° C., and the second temperature is 0 to 120° C., and the third temperature is 0 to 120° C.

19. The method according to claim 1, wherein the first temperature is 90 to 220° C., the second temperature is 0 to 90° C., and the third temperature is 0 to 90° C.

20. A temperature-change adsorption plant (100) for separating a gas mixture flow, comprising:
a plurality of adsorption units (A1, A2, A3) comprising at least a first adsorption unit, a second adsorption unit, and a third adsorption unit, which are each respectively configured to operate in a first and a second operating mode,
wherein, in the first operating mode, means are provided to guide the gas mixture flow (G) at least in part through an adsorption chamber of a respective adsorption unit (A1, A2, A3) and thereby subject the gas mixture flow to an adsorptive exchange of material with at least one adsorbent in an adsorption chamber of the respective adsorption unit,
wherein, in the second operating mode, means are provided to guide a first heat transfer fluid flow (W1) at a first temperature through a heat-exchange arrangement of the respective adsorption unit (A1, A2, A3) and thereby transfer heat from the first heat transfer fluid flow (W1) indirectly to the at least one adsorbent in the adsorption chamber of the respective adsorption unit, and
wherein, in the first operating mode, means are provided to guide a second heat transfer fluid flow (W2) at a second temperature through the heat-exchange arrangement of the respective adsorption unit (A1, A2, A3) and thereby transfer heat from the at least one adsorbent in the adsorption chamber indirectly to the second heat transfer fluid flow (W2);
means to operate the adsorption units (A1, A2, A3) respectively in a third operating mode, which comprises means for guiding a third heat transfer fluid flow (W3) at a third temperature through the heat-exchange arrangement of the respective adsorption unit (A1, A2, A3) and transferring heat from the at least one adsorbent in the adsorption chamber indirectly to the third heat transfer fluid flow (W3); and a first heat transfer fluid circuit (10) coupled to a first buffer container (P1) and a second heat transfer fluid circuit (20) coupled to a second buffer container (P2), and (a) means for supplying, at least in part, the first heat transfer fluid flow (W1) to the second buffer container (P2) in a first time period, and means for supplying, at least in part, the first heat transfer fluid flow (W1) to the first buffer container (P1) in a second time period, and/or (b) means for supplying, at least in part, the third heat transfer fluid flow (W3) to the first buffer container (P1) in the first time period, and means for supplying, at least in part, the third heat transfer fluid flow (W3) to the second buffer container (P2) in the second time period.

21. The plant according to claim 20, wherein said plant includes (a) means for supplying, at least in part, the first heat transfer fluid flow (W1) to the second buffer container (P2) in the first time period, and means for supplying, at least in part, the first heat transfer fluid flow (W1) to the first buffer container (P1) in the second time period.

22. The plant according to claim 20, wherein said plant includes (b) means for supplying, at least in part, the third heat transfer fluid flow (W3) to the first buffer container (P1) in the first time period, and means for supplying, at least in part, the third heat transfer fluid flow (W3) to the second buffer container (P2) in the second time period.

23. The plant according to claim 20, wherein said plant includes (a) means for supplying, at least in part, the first heat transfer fluid flow (W1) to the second buffer container (P2) in the first time period, and means for supplying, at least in part, the first heat transfer fluid flow (W1) to the first buffer container (P1) in the second time period, and (b) means for supplying, at least in part, the third heat transfer fluid flow (W3) to the first buffer container (P1) in the first time period, and means for supplying, at least in part, the third heat transfer fluid flow (W3) to the second buffer container (P2) in a second time period.

\* \* \* \* \*